(No Model.)
C. W. ISBELL.
REFRIGERATING APPARATUS.
No. 538,374. Patented Apr. 30, 1895.
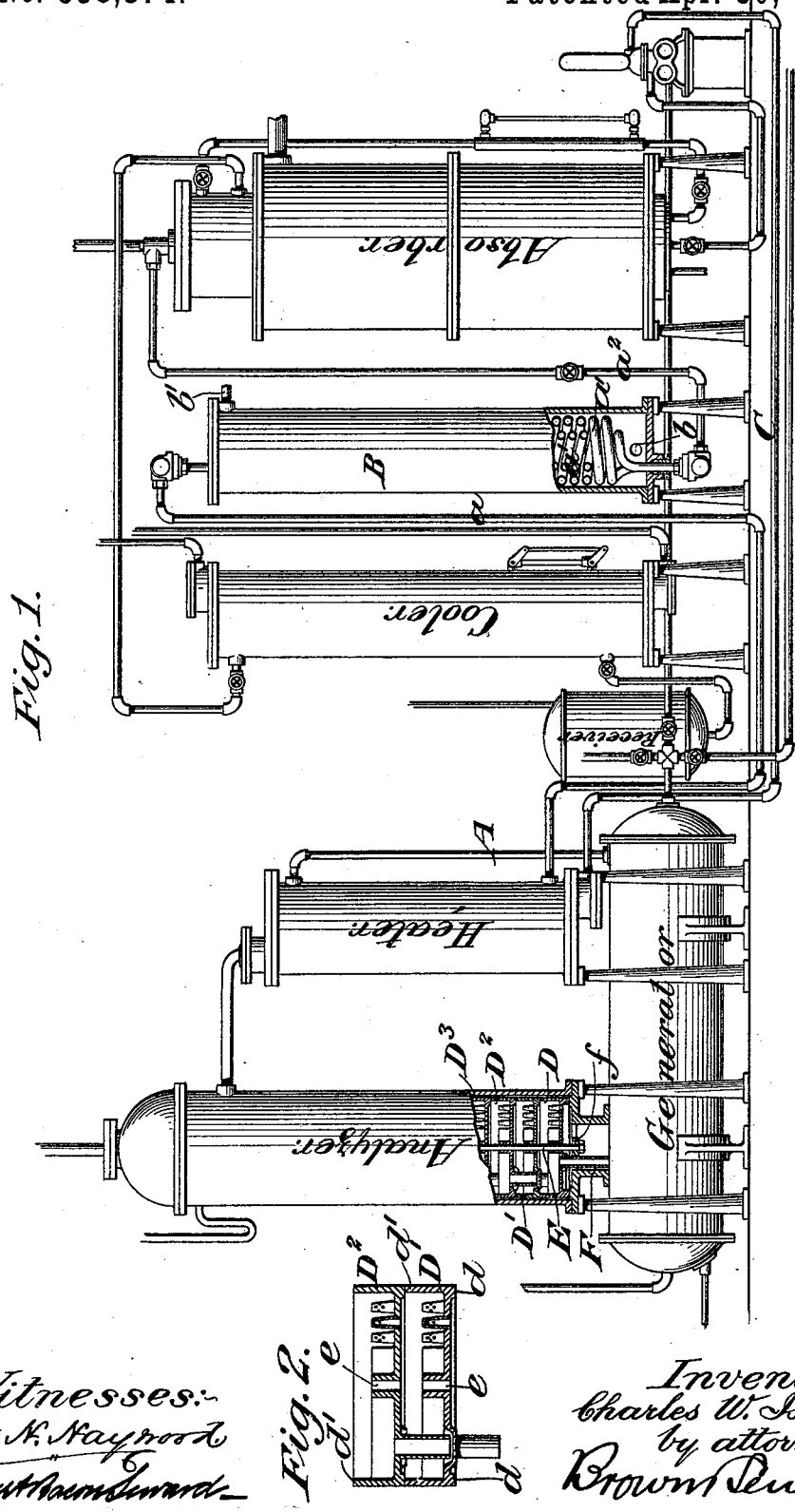
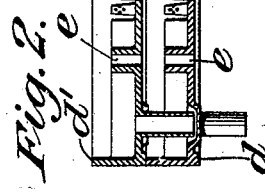
Witnesses:
O. N. Naywood
[signature]
Inventor:
Charles W. Isbell
by attorneys
Brown & Seward

UNITED STATES PATENT OFFICE.

CHARLES W. ISBELL, OF NEW YORK, N. Y.

REFRIGERATING APPARATUS.

SPECIFICATION forming part of Letters Patent No. 538,374, dated April 30, 1895.

Application filed June 18, 1892. Serial No. 437,155. (No model.)

*To all whom it may concern:*

Be it known that I, CHARLES W. ISBELL, of the city and county of New York, in the State of New York, have invented a new and useful Improvement in Refrigerating Apparatus of which the following is a specification.

My invention relates to an improvement in refrigerating apparatus in which the weak liquor in its passage from the heater to the absorber is passed through pipe coils subjected to a cooling medium and which closure of the joints between the trays in the analyzer is made between the top of one tray and the bottom of the next succeeding tray as distinguished from making it between the periphery of the tray and the interior wall of the analyzer as has heretofore been common.

A practical embodiment of my invention is represented in the accompanying drawings, in which—

Figure 1 represents in side elevation so much of a refrigerating apparatus as will be found necessary to fully illustrate the structure and use of my invention, and Fig. 2 represents in detail an enlarged scale of a vertical section through two successive trays of the analyzer.

I have chosen to represent the use of my invention in a general arrangement of receptacles and their connecting pipes quite similar to that shown and described in the United States Patent No. 423,133, granted to H. J. W. S. Cooke, March 11, 1890; and a detailed description of such parts will be omitted in this present application except so far as may be required to a full understanding of the parts which constitute the subject matter of my present invention.

The generator, analyzer, heater, cooler, absorber and receiver are each indicated in Fig. 1 by name. The weak liquor is conducted from the generator to the heater through a pipe A. A pipe $a$ conducts the said weak liquor from the heater to the cooling receptacle denoted by B. In the present instance I have denoted the cooling receptacle B intermediate of the cooler proper and the absorber, but it is to be understood that it may be located in any other convenient position relative to the absorber. The cooling receptacle B is to be distinguished from the cooler proper, the latter being denoted as is common, the particular part of the refrigerating apparatus in which the brine is cooled, while the receptacle B refers to a cooling receptacle for the weak liquor on its passage to the absorbers. The weak liquor passes from the pipe $a$ into pipe coils $a'$ located within the receptacle B and after passing downwardly through said receptacle passes from the coils $a'$ into a pipe $a^2$ which conducts it to the top of the absorber. The cooling medium surrounds the pipe coils $a'$ within the receptacle B and consists in the present instance of a flow of water which is maintained through the receptacle B, the water entering at $b$ at the bottom of the receptacle and passing out at $b'$ at the top. The cooling of the weak liquor before it reaches the absorber enables it to take up the gas much more freely and the cooling is very effectually accomplished by passing the liquor through the coils within the cooling receptacle B.

The strong liquor is forced from the absorber through a pipe C to the heater and through coils within the heater, as is common, into the upper portion of the analyzer where it falls upon the upper of a series of trays and gradually works down, from tray to tray, into the generator, coming in contact during its downward progress with the free gas which is driven off from the generator up through the nozzles with which the trays are provided. The trays within the analyzer are denoted, beginning with the bottom one, by D, D', $D^2$, $D^3$, &c., to the uppermost one. The two trays which I have shown upon an enlarged scale in Fig. 2 are D' and $D^2$, or they may be any two successive trays excepting the lowermost one.

It has hitherto been common to pack the joints between the periphery of the tray and the interior wall of the analyzer with some yielding packing, such for example as oakum. In practice, this has gradually worked out of position and its fibers have accumulated in greater or less quantities at different parts of the apparatus, producing stoppages and finally causing objectionable leaks around the trays. To overcome this objection, I provide the bottom of the tray with an annular downwardly extending projection $d$, the face of which is ground to a tight fit with the upper rim $d'$ of the next succeeding tray, so that when assembled the joint between the top of the rim and one of the trays and the bottom annular projection on the next tray will be tight enough to hold the trays in position so as to keep the joints tight. I extend a bolt or rod E through central perforations $e$ in the trays and through a stationary web $f$ of the hollow support F and provide it with a screw thread and nut for drawing the trays together. The perforations through which the draw bolt or rod E extends are preferably formed in bosses which rise up from the bottoms of the trays. The bottom tray D is fitted tightly to a seat on the upper face of the support F.

By the above construction and arrangement, I am enabled to place the trays in position one under the other within the analyzer with great facility and to remove them at pleasure, while at the same time the gas is held within and forced to pass through the perforations in the trays whether the joint between the peripheries of the trays and the interior wall of the analyzer be tight or loose.

What I claim is—

1. The combination with the generator, analyzer and means for passing the strong liquor into the analyzer, of a plurality of trays located within the analyzer for receiving the strong liquor and passing it gradually downward to the generator, and the top of the one tray and the bottom of the succeeding tray being provided with annular ground faces adapted to rest in contact and form a tight joint, substantially as set forth.

2. The combination with a plurality of trays for an analyzer, the top of one tray and the bottom of the next succeeding tray being provided with ground faces adapted to rest in contact, of a rod or bolt passing through the trays for holding them closely in contact, substantially as set forth.

CHARLES W. ISBELL.

Witnesses:
FREDK. HAYNES,
GEORGE BARRY.